United States Patent

Briley

Patent Number: 5,101,623
Date of Patent: Apr. 7, 1992

[54] ROCKET MOTOR CONTAINING IMPROVED OXIDIZER INJECTOR

[75] Inventor: Gary L. Briley, Chatsworth, Calif.

[73] Assignee: Rockwell International Corporation, El Segundo, Calif.

[21] Appl. No.: 475,540

[22] Filed: Feb. 6, 1990

[51] Int. Cl.$^5$ ............................ F02K 9/28; F02K 1/36
[52] U.S. Cl. ........................................ 60/251; 60/258; 60/740; 239/132; 239/553
[58] Field of Search ................ 60/251, 252, 253, 257, 60/258, 259, 267, 39.461, 39.48, 728, 730, 734, 740; 239/13, 127.1, 132, 266–269, 288, 486, 487, 488, 554, 555, D 13, 590, 553

[56] References Cited

U.S. PATENT DOCUMENTS

| | | | |
|---|---|---|---|
| 947,040 | 1/1910 | Kelly | 239/553 |
| 1,186,226 | 6/1916 | Parker | 239/553 |
| 3,017,747 | 1/1962 | Steele | 60/39.461 |
| 3,177,657 | 4/1965 | Strauss et al. | 60/251 |
| 3,302,403 | 2/1967 | Kryycki et al. | 60/251 |
| 3,325,998 | 6/1967 | Novotny | 60/251 |
| 3,345,822 | 10/1967 | Povinelli et al. | 60/251 |
| 3,354,647 | 10/1965 | Aycock | 60/251 |
| 3,368,353 | 2/1968 | Allport | 60/251 |
| 3,584,461 | 6/1971 | Pessac | 60/251 |
| 3,779,011 | 12/1973 | Verdier | 60/251 |

Primary Examiner—Louis J. Casaregola
Assistant Examiner—John A. Savio, III
Attorney, Agent, or Firm—H. Fredrick Hamann; Harry B. Field

[57] ABSTRACT

There is disclosed in combination with a solid fuel-propellant grain 24 having an axially extending aperture 26, particularly of a hybrid rocket motor, an oxidizer inlet 20 at one end and a combustion gas outlet 22 at the other end, a tubular oxidizer injector 32 disposed in the inlet and extending axially in the grain aperture. The tubular injector comprises a tube 34 containing a plurality of oxidizer injection orifices 38 in the outer circumference of the tube to discharge fluid streams of oxidizer into the fuel grain aperture for combustion of the fuel grain. Additional oxidizer orifices, e.g. in the form of shower head orifices 44, are disposed in the downstream end of the tube. A body member or plug 46 is axially positioned in the tube 34, the plug having an outside diameter smaller than the inside diameter of the tube, and a length less than the length of the tube, and providing an annular channel 50 for the flow of oxidizer, to thereby increase the flow of oxidizer in the injector tube and provide cooling by the oxidizer flowing therein. The tubular injector provides uniform injection of liquid oxidizer, and uniform rapid vaporization of oxygen and combustion stability.

19 Claims, 1 Drawing Sheet

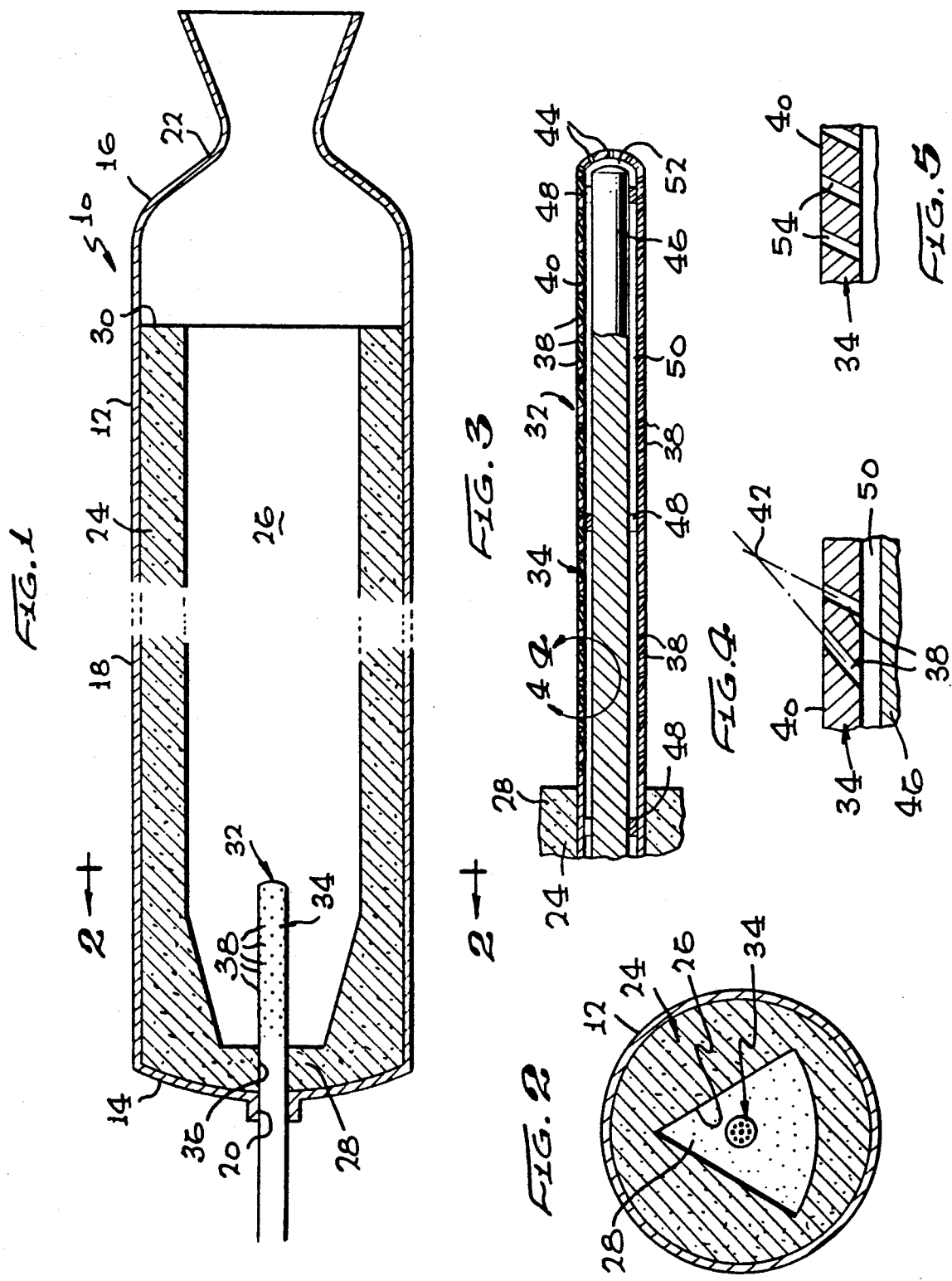

ROCKET MOTOR CONTAINING IMPROVED OXIDIZER INJECTOR

BACKGROUND OF THE INVENTION

1. Field of the Invention

This invention relates to rocket motors employing solid propellant grains, and is particularly directed to a hybrid rocket motor of this type incorporating improved means for injection of oxidizer into the propellant grain during combustion thereof. A hybrid rocket motor is a rocket motor that uses a solid fuel and a liquid oxidizer.

2. Description of the Prior Art

In prior art rocket motors utilizing solid fuel propellant grains, oxidizer such as liquid oxygen is fed in the head end of the rocket motor into a port or cavity in the solid fuel grain for combustion thereof. Thus, a conventional flat or curved shower head-type injector is typically disposed at the head end of the motor, and discharges a spray of liquid droplets into the central cavity of the solid propellant. A field of near zero relative combustion gas to oxidizer droplet velocity occurs near the head end of the rocket motor, with large amounts of liquid droplets, which can produce unstable burning of solid propellant. Further, when employing such shower head-type injectors, which are of relatively large diameter, as the propellant grain burns away, it exposes areas at the head end of the rocket motor which are not part of the injector. That part which is thus exposed as the solid propellant is subject to being burned away, since it does not have oxidizer flowing through it sufficient to cool it. Thus, prior art rocket motors suffer from the disadvantages of non-uniform injection of oxidizer and non-uniform combustion of solid propellant along the length of the propellant grain, and can result in combustion instability, and insufficient cooling of the oxidizer injector.

SUMMARY OF THE INVENTION

According to the invention, an improved rocket motor, particularly a hybrid rocket motor, is achieved by providing a tubular injector for oxidizer injection at the head end of the rocket solid fuel grain comprised of a tube projecting along the axis of the fuel grain within the central axial cavity thereof. The tube contains a plurality of injection orifices in the outer circumference of the tube the orifices preferably being disposed peripherally and substantially along the entire length of the tube. The oxidizer is injected into the cavity or port area of the solid fuel grain through the tube orifices to produce impinging fluid streams, thus atomizing the oxidizer and permitting its rapid gasification and subsequent burning of the solid fuel grain along the length thereof. The downstream end of the tube is provided with shower head orifices also to inject a substantial proportion of the oxidizer axially along the solid fuel grain port. The oxidizer orifice sizes can be varied along the length of the tube to tailor the amount of oxidizer available to burn with the solid fuel.

The oxidizer injector tube is cooled by the oxidizer flowing inside it. Such cooling is enhanced by the provision of a central solid body or plug inserted into the tube and having an outer diameter smaller than the inside diameter of the tube, thus forming an annular flow channel or flow annulus for the oxidizer, and causing more rapid flow of the oxidizer in the tube and enhanced cooling thereof. The size of such annular channel can be tailored to vary the axial oxidizer flow velocity and thus optimizing the cooling effect. Such cooling capability is independent of the burning away of the solid fuel grain.

The tubular injector system of the injection provides enhanced combustion stability by producing a significant combustion gas velocity near the head end of the fuel grain and maintaining a high ratio of combustion gas to liquid droplet velocity along the length of the solid fuel grain until the oxidizer is vaporized. Combustion pressure oscillations are reduced since the oxidizer droplets are vaporized by relatively high velocity hot combustion gasses. The use of the tubular injector of the invention avoids the near zero relative combustion gas to oxidizer droplet velocity, with formation of large amounts of liquid droplets, which takes place when employing the prior art head end injector noted above. The incorporation of the tubular oxidizer injector into the hybrid rocket motor according to the invention thus results in an improved stability of combustion and lack of disturbing pressure oscillations.

OBJECTS OF THE INVENTION

It is accordingly one object of the present invention to provide means in conjunction with a rocket motor incorporating a solid fuel grain propellant, for improving the distribution of oxidizer into the cavity of the fuel grain.

Another object is the provision of a hybrid rocket motor having a solid fuel grain and containing means for uniform injection of oxidizer, particularly liquid oxygen, into the cavity along the axis of the fuel grain.

A further object is to provide an improved rocket motor of the above type which incorporates means for avoiding overheating of the oxidizer injection means.

Other objects and advantages of the invention will be apparent or made obvious by the description below of certain specific embodiments of the invention.

DESCRIPTION OF THE DRAWINGS

FIG. 1 is a cross sectional view of a hybrid rocket motor according to the invention, containing a solid fuel propellant grain and a tubular injector inserted at the head end of the rocket motor into the cavity of the fuel grain;

FIG. 2 is a section taken on line 2—2 of FIG. 1;

FIG. 3 is an enlarged cross section of the tubular injector, incorporating a center body member for cooling the injector;

FIG. 4 is an enlarged sectional detail taken around circle 4—4 of FIG. 3, showing the orifices in the wall of the injector tube; and FIG. 5 is a modification of the orifice system shown in FIG. 4.

DETAILED DESCRIPTION OF THE INVENTION AND PREFERRED EMBODIMENTS

Referring particularly to FIGS. 1 and 2 of the drawing, numeral 10 illustrates a hybrid rocket motor according to the invention, comprising a motor case 12 of a cylindrical configuration having a front portion 14, a back portion 16 and a central portion 18. Each of these three portions serves different functional purpose, the front portion 14 being adapted for feeding a combustion supporting agent or oxidizer such as liquid oxygen through an opening 20. The back portion 16 of the casing 12 is equipped with a converging-diverging nozzle as shown at 22 in order to further aid in the efficient combustion of the fuel and to accelerate the combustion gasses to the optimum exit velocity. The converging-diverging nozzle 22 is of the type normally used in the art.

The central portion 18 of the casing 12 contains a hybrid rocket solid fuel grain 24 having an outer cylindrical configuration in contact with the inner cylindrical surface of the casing 12, the fuel grain having a longitudinal cavity or port 26 therethrough, port 26 extending from a point just inside the front wall 28 of the fuel grain to the back end 30 of the fuel grain, the back end of the port 26 communicating with the back portion 16 of motor case 12. The cross section of the aperture or port 26 in the fuel grain 24 is shown as essentially triangular in shape, as seen in FIG. 2. However, the cross sectional shape of the grain port or aperture is not critical, the main goal being to distribute the oxidizer injected into the port along the length thereof such that the burning of the fuel grain can take place gradually and build up along the length of the grain.

For this purpose, there is provided according to the invention, a means for injecting oxidizer particularly as a liquid, uniformly from orifices along a portion of the longitudinal axis of the fuel grain and into the grain port 26, and for atomizing the oxidizer and have it vaporize and burn with the solid propellant grain. This is achieved by the provision of a tubular injector 32 which comprises a cylindrical tube 34 positioned in the opening 20 in the front portion 14 of the motor case, and extending through an aperture 36 in the front wall 28 of the fuel grain, and axially for a substantial distance into the grain port 26. A plurality of injection orifices 38 are provided in the outer circumference of tube 34 to discharge fluid streams of oxidizer in the form of liquid into port 26 for combustion of the fuel grain. The orifices 38 are disposed peripherally and substantially along the entire length of the cylindrical wall of tube 28.

The length of the tube 28 extending axially within the grain port 26 depends on the size of the engine. The more oxidizer needed to inject into the port 26, the longer the tube 34 would be required. Thus, the length of the tube within the port 26 depends upon motor size, amount of oxidizer to be injected and the ratio of the oxidizer flow rate to the burning rate of the solid. Usually the length of the injector tube within the cavity 26 is significantly less than half the length of the fuel grain 24 or the aperture 26 therein. Generally, the tube 34 of the tubular injector has a length within the port 26 of the order of about 5 to about 10% of the total length of the fuel grain.

The size and spacing of the orifices 38 distributed along the entire axial length of the tube within the port 26 can be designed to obtain optimum uniform distribution and atomization of the oxidizer into the grain port 26 to obtain rapid gasification and burning of the solid grain. Thus, all of the apertures 38 can have the same diameter and their spacing may vary or be the same along the axial length of tube 34. However the orifices need not be the same diameter and for example the diameter of the orifices can gradate starting with small diameters adjacent the head end or front wall 28 of the fuel grain and becoming larger for those orifices extending along the tube toward the downstream end thereof Also, the angle of the orifices can be varied to obtain optimum results, and can be disposed at an acute angle to the axis of the tube 34. Also, the angle of the orifices can be the same or different. Referring to FIG. 4 of the drawing, the orifices 38 in the wall 40 of the tube are arranged in pairs at different angles so that the streams of oxidizer impinge as indicated at 42 and create a fan of drops. Where, as noted above, small orifices are disposed in the tube 34 at the head end, the commencement of burning is started with small streams of oxidizer and as burning progresses along the length of the grain larger and larger orifices can be employed to introduce larger streams of oxidizer into the port 26. The size of the orifices 38 can range from about 0.030" to about 0.200" in diameter.

The downstream end of tube 34 is provided with shower head orifices 44 which can be of the same size as the orifices 38 in the wall of tube 34. Such shower head orifices function to inject a substantial amount of the oxidizer, e.g. about 50% of the oxidizer, axially along the solid grain port 26, for downstream grain burning. However, as in the case of the orifices 38, the size and angle of the shower head orifices 44 also can be varied.

Viewing particularly FIG. 3 a center body in the form of a cylindrical plug 46 is inserted axially into the tube 34. The plug 46 has an outer diameter slightly smaller than the inside diameter of tube 34 and has a length slightly less than the length of tube 34. The plug 46 is maintained in axial position within tube 34 and spaced from the inside wall of the tube, by means of nubs machined on the outer circumference of the plug, which contact the inner peripheral surface of the tube, to maintain the plug centered. The insertion of the plug 46 into tube 34 forms an annular channel or annulus 50 between the outer circumferential wall of plug 46 and the inner circumferential wall 40 of tube 34, in communication with the orifices 38 in the wall of tube 34, and also a channel 52 between the downstream end of the plug and the downstream end of the tube 34, which communicates with the annular or circumferential channel 50. End channel 52 communicates with the shower head orifices 44 in the downstream end of tube 34.

The oxidizer injector tube 34 is cooled by the liquid oxidizer flowing inside the tube. The cylindrical plug 46 reduces the flow area of oxidizer in tube 34 by causing the oxidizer to flow in the narrow annular channel 50 and in end channel 52, so that the oxidizer thus flows at a higher velocity and is more effective in maintaining the outer tube 34 cool and preventing it from burning up by contact with the hot gasses generated in the fuel grain cavity 26 by the combustion process. The larger the plug 46 in diameter, the smaller the annular channel 50, and the faster the oxidizer thus flows, the more effectively it cools the tube 34. The size of the annular channel 50 and channel 52 can be tailored to vary the axial oxidizer flow velocity, and thus optimize the cooling effect. The cooling capability thus produced by the insertion of the plug 46 is independent of the burning away of the fuel grain. The tube 34 and the plug 46 can be fabricated from any suitable metal, and both may be composed of the same metal.

The solid fuel propellant grain 24 can be any solid hydrocarbon, e.g. polymerized ethylene or polybutadiene. The oxidizer is in the form of a liquid, preferably liquid oxygen. However, liquid air, nitrogen tetroxide, red fuming nitric acid, or various liquid oxidizers can be employed.

The tubular oxygen injector system of the invention provides burning uniformly along the fuel grain, and insures that the liquid oxidizer, e.g. liquid oxygen, does not quench the flame. As the liquid oxygen moves downstream in the annular channel 50, more and more liquid oxygen is injected into the fuel grain port 26, producing impinging fluid streams and atomizing the oxidizer and permitting rapid gasification thereof and burning of the solid grain. To produce burning of the solid propellant grain, the grain must first be converted to a gas, which is achieved by first melting the fuel grain to form a liquid, and then transforming it to a gas. The gasified oxidizer and the fuel grain gas thus burn to form the combustion gasses in fuel grain port 26. Ignition of the fuel grain commences very quickly following discharge of atomized oxidizer into cavity 26 and in contact with the fuel grain, and the fuel grain is consumed at a relatively constant rate. Gaseous reaction products build up a pressure in the port 26 which forces the products of combustion through the nozzle 22 at the back portion 16 of the rocket motor casing. As pressure builds up within port 26, the rate of combustion increases.

Maintaining a near optimum mixture ratio of oxidizer to evaporated gases from the surface of the fuel grain near the head end of the fuel grain port 26 maximizes the temperature and the amount of gas produced at the head end. This accordingly maximizes the axial velocity of the combustion gases emanating from the head end of the port which, in turn, maximizes or optimizes the gasification rate of the injected oxidizer due to the relatively large velocity differential between the combustion gases and oxidizer droplets. Thus the object is to burn the gases near the head end of the grain port 26, with the hottest possible flame, to create as much combustion gases as possible, which will then travel downstream at high velocity, so that they will shear and break up the liquid oxidizer being injected.

The combustion stability of the system is enhanced by the tubular injection concept of the invention which produces a significant combustion gas velocity near the motor head end and maintains a high ratio of combustion gas to liquid droplet velocity along the length of the motor until the oxidizer is vaporized. Combustion pressure oscillations are less likely when the oxidizer droplets are being vaporized by relatively high velocity hot gases. Thus, small variation in the vaporization rate will not significantly affect the larger gas velocity vector. This is in contrast to the operation of the flat or curved face shower end injector of the prior art, noted above, which discharges a spray of oxidizer into the head end of the propellant grain, resulting in a field of near zero relative combustion gas to oxidizer droplet velocity. By use of such prior art head end injector, where all of the oxidizer is inserted into the head end, a point is reached where the velocity of the oxidizer droplets moving down the combustor is the same as the combustion gases moving down the combustor, and can result in unstable burning along the length of the grain.

On the other hand, by use of the tubular oxidizer injector of the invention, combustion is started by discharge of a small amount of liquid oxidizer at the head end to generate some combustion gas at the head end, whereby the combustion gas is permitted to move faster than the oxidizer droplets along the length of the oxidizer tube and when the velocity of the combustion gases is very high with respect to the velocity of the oxidizer droplets, combustion stability is enhanced and there is minimum chance of combustion instability taking place, and the vaporization of the injected oxidizer is enhanced by the high combustion gas velocity.

It will be understood that various modifications of the invention device will occur to those skilled in the art. Thus, for example, as seen in FIG. 5, orifices 54 of the same size and disposed at the same acute angle can be provided in the periphery and along the length of injector tube 34, in place of the orifices 38 disposed at different angles, as shown in FIG. 4. Further, while a single port fuel grain is illustrated in FIGS. 1 and 2, multiple port applications can be accommodated by providing a tubular oxidizer injector according to the invention for each port in the solid grain.

Although the present invention is particularly applicable to a hybrid rocket motor, it will be understood that the invention device is also applicable to use with other types of rocket motors.

From the foregoing, it is seen that there is provided according to the invention a tubular oxidizer injector for rocket motors, particularly a hybrid rocket motor, which has the advantages of uniform injection of liquid oxidizer, uniform, rapid vaporization of oxidizer and combustion stability, avoidance of injector overheating, and which can be tailored to provide varying thrust levels. The tubular injector concept of the present invention is applicable for hybrid rocket applications such as for rocket launch systems.

It is to be understood that what has been described is merely illustrative of the principles of the invention and that numerous arrangements in accordance with this invention may be devised by one skilled in the art without departing from the spirit and scope thereof.

What is claimed is:

1. In combination with a solid fuel-propellant grain having an axially extending aperture, an oxidizer inlet at one end and a combustion gas outlet at the other end, the improvement which comprises a tubular oxidizer injector in said inlet and extending axially in said aperture, said tubular injector comprising a tube containing a plurality of injection orifices in the outer circumference of said tube to discharge fluid streams of oxidizer into said aperture for combustion of said fuel grain, and including a body member disposed in said tube, said body member having an outer diameter smaller than the inside diameter of said tube, and providing an annular channel for the flow of oxidizer.

2. The combination of claim 1, said tube extending only partially into said axially extending aperture.

3. The combination of claim 1, said tube having a length of about 5 to about 10% of the total length of the solid fuel grain.

4. The combination of claim 1, the ratio of the length of the tube to its diameter ranging from about 10 to 1 to about 12 to 1.

5. The combination of claim 1, said injection orifices being disposed peripherally and substantially along the entire length of said tube.

6. The combination of claim 1, the size of said orifices ranging from about 0.030" to about 0.200" in diameter.

7. The combination of claim 1, said orifices being disposed at an acute angle to the axis of said tube.

8. The combination of claim 1, all of said orifices being disposed at substantially the same angle.

9. The combination of claim 1, and including orifices in the downstream end of said tube.

10. The combination of claim 9, said orifices in said downstream end of said tube being in the form of shower head orifices.

11. The combination of claim 1, said tube extending into said aperture for a distance of less than one half the axial length of said aperture, said injection orifices being disposed peripherally and substantially along the entire length of said tube, said orifices being disposed at an acute angle to the axis of said tube, and including shower head orifices in the downstream end of said tube, and said body member having a length less than the length of said tube.

12. A hybrid rocket motor comprising
   an outer casing,
   an oxidizer inlet at one end of said casing,
   a converging diverging nozzle forming a combustion gas outlet at the other end of said casing,
   a solid fuel propellant grain in said casing and having an outer configuration matching the inner configuration of said casing, said fuel grain having an axially extending aperture, and
   a tubular oxidizer injector disposed in said inlet and extending axially in said aperture, said tubular injector comprising a tube containing a plurality of injection orifices in the outer circumference of said tube to discharge fluid streams of oxidizer into said aperture for combustion of said fuel grain, and including a cylindrical body member disposed in said tube, said body member having an outer diameter smaller than the inside diameter of said tube, and providing an annular channel for the flow of oxidizer.

13. The rocket motor of claim 12, said tube extending only partially into said axially extending aperture.

14. The rocket motor of claim 12, said injection orifices being disposed peripherally and substantially along the entire length of said tube.

15. The rocket motor of claim 12, said orifices being disposed at an acute angle to the axis of said tubular injector.

16. The rocket motor of claim 12, and including orifices in the downstream end of said tube.

17. The rocket motor of claim 12, said tube extending into said aperture having a distance of less than one half the axial length of said aperture, said injection orifices being disposed peripherally and substantially along the entire length of said tube, said orifices being disposed at an acute angle to the axis of said tubular injector, and including shower head orifices in the downstream end of said tube, and said body member having a length less than the length of said tube, and means for maintaining said body member in axial position in said tube.

18. The rocket motor of claim 17, said tube having a length of about 5 to about 10% of the total length of the solid fuel grain, the ratio of the length of the tube to its diameter ranging from about 10 to 1 to about 12 to 1, and the size of said orifices ranging from about 0.030" to about 0.200" in diameter.

19. The combination of claim 1, said orifices being disposed in pairs at different angles.

* * * * *